Dec. 17, 1968    E. L. SCHENK    3,416,385
SPROCKET ASSEMBLY
Filed March 20, 1967
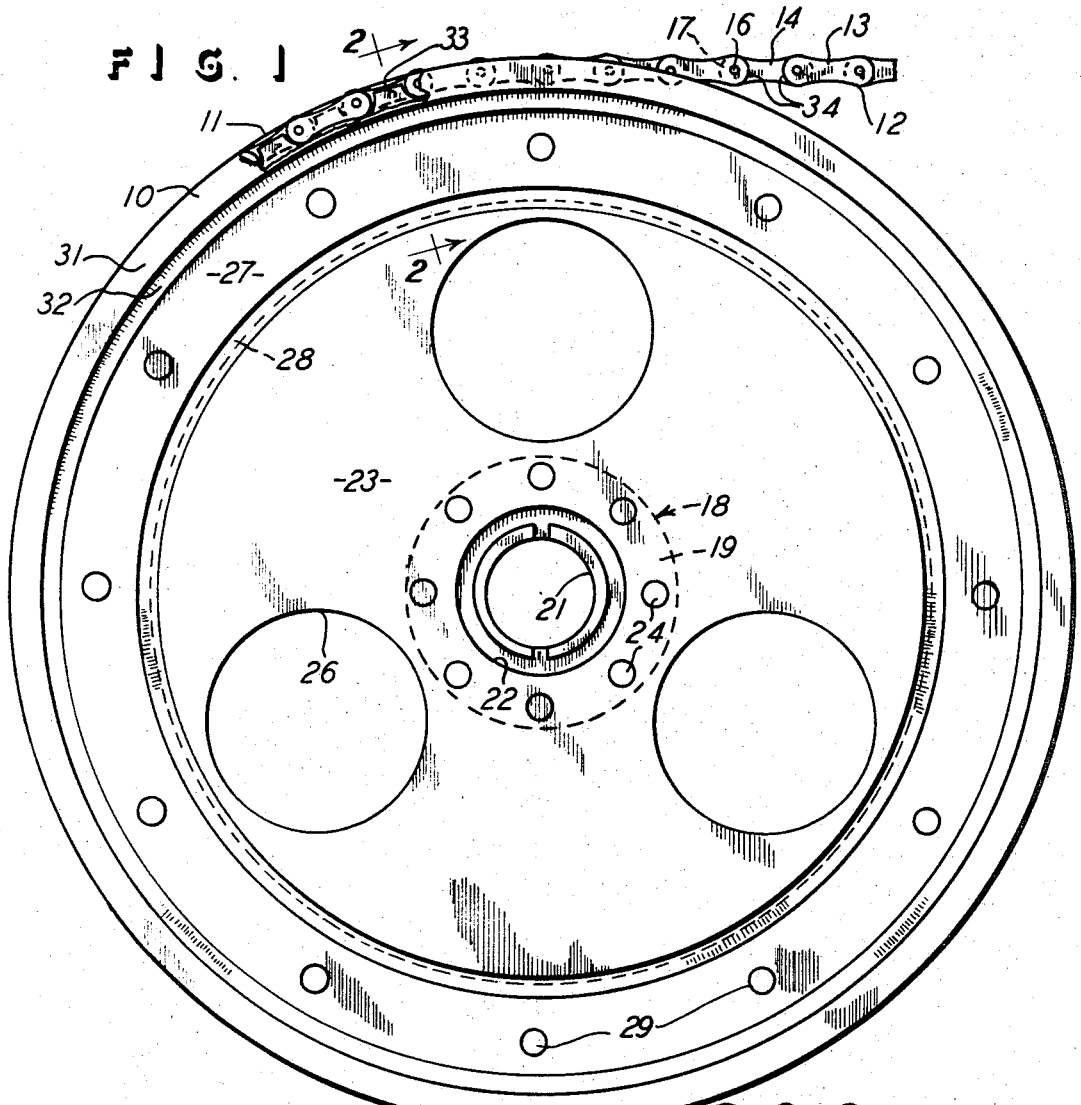
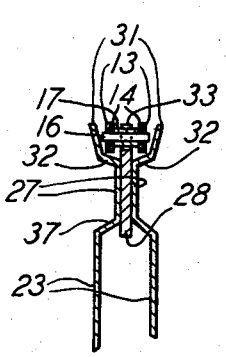
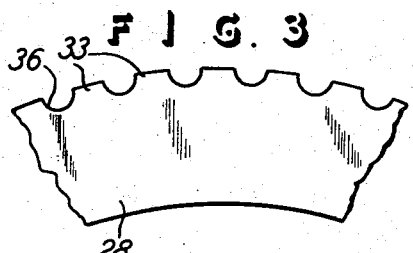
INVENTOR:
ERWIN L. SCHENK
Arthur J. Hansmann
ATTORNEY

United States Patent Office 3,416,385
Patented Dec. 17, 1968

3,416,385
SPROCKET ASSEMBLY
Erwin L. Schenk, Moline, Ill., assignor to J. I. Case Company, Racine, Wis., a corporation of Wisconsin
Filed Mar. 20, 1967, Ser. No. 624,258
6 Claims. (Cl. 74—243)

ABSTRACT OF THE DISCLOSURE

Two circular plates of relatively thin material are formed to be spaced apart in certain areas and to be secured together in other areas. Flanges are provided on the circumferences of the plates, and these flanges guide the sprocket chain which is also meshed with a toothed ring secured intermediate the plates in the vicinity of the flanges. Also, a hub is secured between the plates and provides a cylindrical opening for mounting of the sprocket. The various pieces can be made from stampings, and the thin plates are shaped to have adequate strength comparable to cast or forged sprockets of considerably heavier and more expensive materials and manufacturing processes.

Background of the invention

This invention relates to a sprocket assembly.

The prior art contains knowledge of fabricated sprockets formed in two plate halves by stampings or the like. The plate halves may be riveted or bolted together, and they sometimes present circular flanges on the circumferences of the plates, and the sprocket chain is disposed between the flanges and on teeth which are also either stamped into the plates or are otherwise provided on the plates. Further, the prior art discloses the fabrication of a sprocket with a body member made of one material of a piece or two joined together, and another piece, such as a ring having teeth, is commonly secured to the body piece to present the sprocket teeth around the circumference of the sprocket, as desired.

The problem with these sprockets of the prior art is that they are generally heavy in that the pieces forming the various parts are individually heavy pieces commonly made by casting, and they are therefore also expensive. Such fabricated sprockets, and the methods of making them, are of very little improvement over the non-fabricated sprockets, that is, the type which is completely cast in one-piece and which is therefore generally heavy and expensive in order to withstand the necessary forces to which it is subjected.

The present invention meets the requirements for low cost, strong, light weight sprockets of a large diameter by fabricating the sprocket out of two large diameter, but relatively thin, plates and providing separate pieces for the sprocket hub and for the sprocket teeth. Further, the circumferences of the plates provide flanges for supporting the sprocket chain, and thus the entire force of the chain on the sprocket is not taken solely by the ring piece having the teeth. Still further, the plates are shaped and secured together so that they are sufficiently sturdy, even though they are of thin material, and they thereby laterally support the chain and resist its forces. Still further, the flanges on the plates, which flanges are adjacent the sides of the chain, serve to guide the chain and keep it on the teeth even though the teeth have no guiding taper on their sides and the sprocket is of a large diameter and therefore inclined to have the chain run off the sprocket teeth.

The sprocket structure, and method of making same, is such that the sprocket teeth are disposed on the center of the sprocket, rather than to one side, and the chain is therefore also centered on the sprocket and is drivingly engaged on its center by the teeth. Thus, the problem with certain prior art fabricated sprockets, where the teeth are offset from the center plane of the sprocket, is overcome.

Brief description of the drawing

FIG. 1 is a side elevational view of a sprocket of this invention, with parts thereof broken away, and showing a chain with certain links removed.

FIG. 2 is a sectional view on the line 2—2 of FIG. 1.

FIG. 3 is a side elevational view of a fragment of the piece having the sprocket teeth.

Description of the preferred embodiment and the method of making same

Two identical circular plates 10 and 11 present two halves of the sprocket. A chain 12 is in driving relation with the sprocket, and it is shown to consist of pairs of outside links 13 and inside links 14 which are also in pairs. Further, the chain is shown to have a connecting pin 16 and a spacer 17 which extends intermediate the ends of the pairs of inside links 14.

The sprocket also includes a piece 18 which is the sprocket hub, and it has a flange 19 and a cylindrical portion 21. Thus the plates 10 and 11 have central openings, such as the opening 22 through which the cylindrical portion or sleeve 21 can project and is therefore available for mounting the sprocket on a shaft, in any conventional manner. The flange 19 is disposed between the plates 10 and 11 which are therefore spaced apart in the central portion designated 23 so that the plates 10 and 11 are in abutting contact with the opposite faces of the circular flange 19. The plates 10 and 11 and the flange 19 are then secured together, by spot welding as indicated at 24, or by any other suitable means. Thus, the hub 18 can be provided in a piece which is of adequate strength for the installation involved, and the plates 10 and 11 can be made of a thin material, such as even sheet metal. Because of their particular shape, which is formed by stamping or the like to provide for the configuration shown in FIG. 1 and FIG. 2, the halves 10 and 11 are of adequate strength both radially and axially of the sprocket to support heavy loads, even though the sprocket is fabricated rather than cast or the like. Thus, even openings 26 can be formed in both of the plates 10 and 11, and the sprocket is then of even lighter weight, if desired. FIG. 2 shows the spacing of the center portions 23, and it shows that the outer circumferential portions 27 are disposed toward each other, and another piece, such as a ring 28 formed of a flat plate which is shown to be thicker than the thickness of the plates 10 and 11, is disposed between the portions 27. Again, the portions 27 and the ring 28 are all secured together by means, such as spot welding indicated by the circles 29.

The outer periphery or circumferences of the sprocket body, as formed by the plates 10 and 11, contain radially disposed flanges 31 and axially disposed flanges 32. These flanges are formed in the body pieces 10 and 11 by stamping, or by other conventional means, and they are shown to be spaced apart and adjacent the piece 28 which contains the sprocket teeth 33. The teeth 33 may also be formed in the piece 28 by a stamping process, or a piece could be used in place of the piece 28 and be shaped in a wave form so that teeth would be presented on the new piece described and these teeth would be disposed in the circumferential pattern shown with regard to the teeth 33. Thus the teeth 33 project into the chain 12 and intermediate its pairs of inner links 14, and they are therefore available for engaging the cross pieces 17 and also engaging the edges 34 of the outer links 13. The teeth 33 are therefore centered on the sprocket, and they are in driving relation with the chain on the center plane or the chain, rather than to one side thereof.

The axial flanges 32 are disposed in a position to support the chain 12 by engaging the radially inner edges of the chain links 13 and 14. This therefore relieves the piece 28 and its teeth 33 from some of the load. The flanges 32 therefore provide a limiting support of the chain links on a pitch circle, which is not the theoretical pitch circle.

The flanges 31 are disposed immediately adjacent the sides of the chain 12 to guide the chain 12 with respect to the sprocket, and to center the chain on the sprocket and with respect to the plate 28. This is of course important on particularly a large diameter sprocket where the chain is running in a position approximating a straight line, and it is therefore inclined to climb onto and run off the sprocket teeth. However, the flanges 31 are available for preventing this type of derailment, and there is no need for sprocket teeth with tapered sides to keep the chain from running off.

Further, the flanges 31 and 32 exist for strengthening the plates 10 and 11 in that they are spaced apart and thereby provide lateral, which is axial, support and strength to the sprocket body pieces 10 and 11. These pieces can therefore be made of the thin sheet metal material, and they can be stamped, as described.

The piece 28 can either be stamped in a circular form shown, or it can be stamped in one straight strip with circles formed down the center. Then the strip can be cut along its center line to form the half-circles 36 which delineate the teeth 33, and the half-strips can then be bent on edge to form the segments or complete circles for assembly in the sprocket as shown.

From the foregoing it will be understood that the method is the forming of the two pieces 10 and 11, and this may be by stamping them, and they are then assembled with the piece 28, formed as described, and the hub 18. The four pieces are then secured together by conventional means, such as the spot welding shown and mentioned. The pieces 10 and 11 are therefore formed as disk elements, and they may be flat or somewhat conical, as shown in the sections 37, and they are either formed in press-forming or by forming in assembly. Also, the piece 28 may be formed from the single strip described by piercing the holes forming the half-circles 36, prior to shearing through the center of the holes and arcuately shaping the blanks or piece as mentioned. With this method, and the resulting structure, the semi-circles 36 form a tooth dedendum which is arcuate and thereby nests with the cylindrical cross-pieces 17 and abuts the link arcuate edges of the links 14.

This process, as claimed, is not an obvious process, and, the process, as claimed, cannot be made by a materially different process.

While a specific embodiment and method have been shown and described, it should be obvious that certain changes can be made therein, and the invention should be determined by the scope of the appended claims.

What is claimed is:

1. A sprocket of the fabricated type having two outer pieces and a ring of sprocket teeth secured between said two pieces for drivingly receiving a chain in mesh with said teeth, wherein the improvement comprises said two outer pieces consisting of two circular plates secured together and having their circumferential portions spaced apart and disposed in radially outer and radially inner angulated sections and presenting two pairs of annular flanges for guiding the chain on said sprocket, both said pairs of said annular flanges extending in directions diverging from the central axes of said circular plates and adjacent the pitch diameter of said teeth and spaced away from said ring and adjacent the inside edge of said chain trained around said sprocket for radially guiding said chain on said sprocket, the angle of divergence of the radially outer pair of said flanges being greater than that of the radially inner pair of said flanges.

2. The subject matter of claim 1, wherein said circular plates are of a uniform thickness throughout, and are of sheet metal and have central portions extending from said ring to adjacent the central axes of said circular plates, said plates being angulated in said circumferential portions adjacent said ring.

3. The subject matter of claim 1, including a hub having a cylindrical piece and an integral flange extending coaxially with the central axes of said circular plates, said circular plates extending in central portions from said sprocket teeth to said integral flange on opposite sides thereof and being secured thereto.

4. The subject matter of claim 3, wherein said circular plates are of a uniform thickness throughout, and are of sheet metal and planar in said central portions and angulated in said circumferential portions adjacent said ring, and with all said angles on said circular plates being diverging about the central axes of said circular plates.

5. The subject matter of claim 3, wherein said circular plates are each of a thickness less than the thickness of said ring and are spaced apart throughout said central portions and are shaped to provide lateral stiffness.

6. The subject matter of claim 5, wherein said circular plates are of a uniform thickness throughout, and are of sheet metal and planar in said central portions and angulated in said circumferential portions adjacent said ring, and with all said angles on said circular plates being diverging about the central axes of said circular plates.

References Cited

UNITED STATES PATENTS

| | | | |
|---|---|---|---|
| 1,181,175 | 5/1916 | Shapiro | 74—243 |
| 2,295,531 | 9/1942 | Heaslet | 74—230.8 |
| 2,553,791 | 5/1951 | Smith | 74—230.3 |
| 2,641,935 | 6/1953 | Wilken | 74—230.8 |
| 2,680,380 | 6/1954 | Bagley | 74—230.8 |
| 3,083,582 | 4/1963 | Wheeler | 74—243 XR |

FOREIGN PATENTS 335,746   10/1930   Great Britain.

FRED C. MATTERN, Jr., *Primary Examiner.*

J. A. WONG, *Assistant Examiner.*